United States Patent
Kim et al.

(10) Patent No.: US 10,644,326 B2
(45) Date of Patent: May 5, 2020

(54) LITHIUM-AIR BATTERY CATALYST HAVING 1D POLYCRYSTALLINE TUBE STRUCTURE OF RUTHENIUM OXIDE-MANGANESE OXIDE COMPLEX, AND MANUFACTURING METHOD THEREOF

(71) Applicant: Korea Advanced Institute of Science and Technology, Daejeon (KR)

(72) Inventors: Il-Doo Kim, Daejeon (KR); Ki Ro Yoon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 328 days.

(21) Appl. No.: 15/527,733

(22) PCT Filed: Jul. 4, 2016

(86) PCT No.: PCT/KR2016/007188
§ 371 (c)(1),
(2) Date: May 18, 2017

(87) PCT Pub. No.: WO2017/007203
PCT Pub. Date: Jan. 12, 2017

(65) Prior Publication Data
US 2017/0331120 A1 Nov. 16, 2017

(30) Foreign Application Priority Data
Jul. 6, 2015 (KR) .................. 10-2015-0096057

(51) Int. Cl.
*H01M 4/86* (2006.01)
*H01M 4/90* (2006.01)
(Continued)

(52) U.S. Cl.
CPC ............ *H01M 4/9016* (2013.01); *C08K 3/10* (2013.01); *D01D 5/003* (2013.01); *D01F 1/09* (2013.01);
(Continued)

(58) Field of Classification Search
None
See application file for complete search history.

(56) References Cited

U.S. PATENT DOCUMENTS 8,518,583 B2 8/2013 Mizuno et al.
2010/0033903 A1* 2/2010 Kim ...................... H01G 11/46
361/502
(Continued)

FOREIGN PATENT DOCUMENTS

JP 2008311223 A 12/2008
JP 2013504143 A 2/2013
(Continued)

OTHER PUBLICATIONS

KR101284610B1—machine translation (Year: 2013).*
(Continued)

*Primary Examiner* — Haroon S. Sheikh
(74) *Attorney, Agent, or Firm* — Cahn & Samuels, LLP

(57) ABSTRACT

A lithium-air battery catalyst having a 1D polycrystalline tubes structure of a ruthenium oxide-manganese oxide complex includes the ruthenium oxide-manganese oxide complex having at least one polycrystalline tubes structure among a core fiber-shell patterned nanotubes structure and a double walls patterned composite double tubes structure, and the ruthenium oxide-manganese oxide complex is formed as an air electrode catalyst.

15 Claims, 9 Drawing Sheets

(51) Int. Cl.
  C08K 3/10    (2018.01)
  D01D 5/00    (2006.01)
  D01F 1/09    (2006.01)
  D01F 6/20    (2006.01)
  H01M 12/08   (2006.01)
  D01F 1/10    (2006.01)
  H01M 4/88    (2006.01)
  H01M 4/38    (2006.01)

(52) U.S. Cl.
  CPC .......... *D01F 1/10* (2013.01); *D01F 6/20* (2013.01); *H01M 4/8652* (2013.01); *H01M 4/8857* (2013.01); *H01M 4/8882* (2013.01); *H01M 12/08* (2013.01); *D10B 2401/16* (2013.01); *H01M 4/382* (2013.01); *H01M 4/8668* (2013.01); *H01M 4/8673* (2013.01); *H01M 2004/8689* (2013.01); *H01M 2220/20* (2013.01); *Y02E 60/128* (2013.01)

(56) References Cited

U.S. PATENT DOCUMENTS

| | | |
|---|---|---|
| 2012/0077094 A1 | 3/2012 | Yager et al. |
| 2013/0330640 A1 | 12/2013 | Badding et al. |

FOREIGN PATENT DOCUMENTS

| | | | |
|---|---|---|---|
| JP | 2013-218986 A | | 10/2013 |
| JP | 2013218986 A | | 10/2013 |
| KR | 10-2011-0072222 A | | 6/2011 |
| KR | 20110072222 A | | 6/2011 |
| KR | 10-2013-0075487 A | | 7/2013 |
| KR | 10-1284610 B1 | | 7/2013 |
| KR | 101284610 B1 | | 7/2013 |
| KR | 20130075487 A | | 7/2013 |

OTHER PUBLICATIONS

KR20110072222—machine translation (Year: 2011).*
JP2013218986—machine translation (Year: 2013).*
KR20130075487—machine translation (Year: 2013).*
English Abstract of JP2008311223 A, dated Dec. 25, 2008.
English Abstract of JP2013218986 A, dated Oct. 24, 2013.
English Abstract of JP2013504143 A, dated Feb. 4, 2013.
English Abstract of KR101284610 B1, dated Jul. 17, 2013.
English Abstract of KR20110072222 A, dated Jun. 29, 2011.
English Abstract of KR20130075487 A, dated Jul. 5, 2013.
Mou et al., "Oriented Contraction: A Facile Nonequilibrium Heat-Treatment Approach for Fabrication of Maghemite Fiber-in-Tube and Tube-in-Tube Nanostructures" Langmuir 2010, 26(19), 15580-15585.
Japanese Office Action in JP Patent Application No. 2017-507783, dated Mar. 2018.
Mou, F. et al, "Oriented Contraction: A Facile Nonequilibrium Heat-Treatment Approach for Fabrication of Maghemite Fiber-in-Tube and Tube-in-Tube Nanostructures", Langmuir, 2010, vol. 26, No. 19, 15580-85.
English Abstract of KR 10-1284610.
Enlgish Abstract of KR 10-2013-0075487.
English Abstract of JP 2013-218986.
English Abstract of KR 10-2011-0072222.

* cited by examiner

LITHIUM-AIR BATTERY CATALYST HAVING 1D POLYCRYSTALLINE TUBE STRUCTURE OF RUTHENIUM OXIDE-MANGANESE OXIDE COMPLEX, AND MANUFACTURING METHOD THEREOF

This application is a US national stage application of PCT/KR2016/007188 filed Jul. 4, 2016. A claim for priority under 35 U.S.C. § 119 is made to Korean Patent Application No. 10-2015-0096057 filed Jul. 6, 2015, in the Korean Intellectual Property Office, the entire contents of which are hereby incorporated by reference.

BACKGROUND

Embodiments of the inventive concept described herein relate to a lithium-air battery catalyst having a 1D polycrystalline tube structure of a ruthenium oxide-manganese oxide complex and a manufacturing method thereof, and more particularly, relate to a lithium-air battery catalyst including a ruthenium oxide-manganese oxide complex tubes structure having a core fiber-shell patterned nanotubes structure or a double walls patterned composite double tubes structure, and a manufacturing method thereof.

In a rapid increase of worldwide energy demand along development of industrial technology, being rid of environmental problems due to fossil fuels as current main energy supply sources, many interests and demands are focusing on exploitation of production and storage systems for eco-friendly alternative energy. Lithium-air batteries are coming to the forefront as the development-promising new generation energy storage devices owing to their theoretical energy density equal to or 10 times higher than that of current lithium-ion batteries, and their eco-friendliness. Especially, because the lithium-air battery utilizes oxygen as a reaction fuel for an air electrode (or cathode) and utilizes a lithium metal as an anode, it has high theoretical energy density that is comparable to that of current gasoline fuel. Therefore, the lithium-air batteries are being in the limelight as technology for commercialization of electric vehicles.

In activating a lithium-air battery, oxygen of air meets lithium ions in an electrolyte and forms a solid lithium peroxide during a discharge on an air electrode (oxygen reduction reaction; $O_2(g)+2Li^++2e^- \to Li_2O_2(s)$), and the lithium peroxide is decomposed again into oxygen and lithium ions during a charge (oxygen evolution reaction; $LiO_2(s) \to O_2(g)+2Li^++2e^-$).

However, a large amount of energy loss is accompanied on an electrochemical reaction with lithium and oxygen and thereby the battery becomes remarkably lower in lifetime characteristics. Accordingly, to prevent energy loss during such a discharge and a charge, some studies have proceeded for developing an OER and ORR active catalysts to be employed for air electrodes.

Nowadays many studies for varieties of catalysts are still in progress, having been advanced in enhancing the battery efficiency through development of air electrodes where carbon materials are combined with catalysts based on precious metals, such as Au, Ag, Pt, Pd, Ru, and Ir, or based on transition metal oxides such as $MnO_2$, $Mn_2O_3$, $CO_3O_4$, $CuO$, $Fe_2O_3$, $LaMnO_3$, $MnCo_2O_4$, $Ba_{0.5}Sr_{0.5}Co_{0.2}Fe_{0.8}O_3$. Activity of catalysts is dependent on varieties of element technologies such as manufacturing method, surface structure, crystallinity, oxidation number, and specific surface area. In the meantime, there are also progressing developments of nanostructures for strengthening activity of catalysts and efforts for finding catalytic materials having good bifunctional reactivity such as OER and ORR.

SUMMARY

Embodiments of the inventive concept provide a lithium-air battery catalyst including a ruthenium oxide-manganese oxide complex tubes structure having a core fiber-shell patterned nanotubes structure or a double walls patterned composite double tubes structure, and a manufacturing method thereof.

Embodiments of the inventive concept provide a highly efficient lithium-air battery air electrode catalyst, which is highly improved in lifetime characteristics of the lithium-air battery and minimized in energy loss during a discharge and a charge owing to excellent catalytic performance of OER and ORR, and a manufacturing method thereof.

According to an aspect of an embodiment, a lithium-air battery catalyst having a 1D polycrystalline tubes structure of a ruthenium oxide-manganese oxide complex includes the ruthenium oxide-manganese oxide complex having at least one polycrystalline tubes structure of a core fiber-shell patterned nanotubes structure and a double walls patterned composite double tubes structure, wherein the ruthenium oxide-manganese oxide complex forms an air electrode catalyst.

The ruthenium oxide of the ruthenium oxide-manganese oxide complex may be $RuO_2$.

The manganese oxide of the ruthenium oxide-manganese oxide complex may be at least one or more of $Mn_2O_3$ and $MnO_2$.

The core-shell patterned nanotubes structure may include a nanotubes structure in which a core is placed with the ruthenium oxide in a nanofiber structure, a shell is placed with the manganese oxide in a tube patterned shell structure, and the core and the shell are separated each other through an air gap.

The core fiber-shell patterned nanotubes structure may include a structure in which core fibers are locally mixed with shells due to non-uniform distribution of air gaps between the core fibers and the shells.

The core fiber-shell patterned nanotubes structure may include core nanofibers having diameters ranged from 10 to 500 nm, and the nanotubes forming shells may have diameters ranged from 15 to 1,000 nm.

The double walls patterned composite double tubes structure may include a core fiber and a shell, which are undistinguished, without phase separation in a double walls pattern formed of an inner tube and an outer tube that are uniformly complexed with a mixture of a ruthenium oxide and a manganese oxide.

The double walls patterned composite double tubes structure may include an air gap between an inner wall and an outer wall, wherein the tubes may be respectively separated each other through the air gap in an interval from 5 to 500 nm.

The inner and outer walls of the double walls patterned composite double tubes structure may have a local part that is present without separation.

The double walls patterned composite double tubes structure may include a double walls pattern of an inner tube and an outer tube, the inner tube may have a diameter ranged from 10 to 500 nm, and the outer tube may have a diameter ranged from 15 to 1,000 nm.

A thickness of an outer wall of a shell of the core fiber-shell patterned nanotubes structure and thicknesses of inner and outer walls of the double walls patterned composite double tubes structure may be ranged from 1 to 100 nm.

According to another aspect of the inventive concept, a manufacturing method of a lithium-air battery catalyst having a 1D polycrystalline tubes structure of a ruthenium oxide-manganese oxide complex includes manufacturing an electrospinning solution by dissolving ruthenium precursors and manganese precursors in a solvent where a polymer is dissolved, synthesizing polymer complex nanofibers, which include the ruthenium precursors and the manganese precursors, from the electrospinning solution by using an electrospinning process, forming a ruthenium oxide-manganese oxide complex, which has the polycrystalline tubes structure, by treating the polymer complex nanofibers at high temperature, and forming slurry by using the ruthenium oxide-manganese oxide complex, and forming a lithium-air battery catalyst by forming an air electrode through a casting from the slurry.

The forming of the ruthenium oxide-manganese oxide complex may include forming the ruthenium oxide-manganese oxide complex, which has the polycrystalline tubes structure, by selecting at least one of a core fiber-shell patterned nanotubes structure, which is thermally treated in a low heating rate, and a double walls patterned composite double tubes structure, which is thermally treated in a high heating rate, during high temperature thermal treatment.

Additionally, the forming of the lithium-air battery catalyst may include selecting at least one or more of the core fiber-shell patterned nanotubes structure and the double walls patterned composite double tubes structure, mixing the ruthenium oxide-manganese oxide complex with a conductive material, which includes at least one or more of Ketjen black, graphene, and carbon nanotubes, and an adhesive material including at least one or more of polyvinylidene fluoride (PVdF), styrene-butadiene rubber (SBR)/carboxymethyl cellulose (CMC), and polytetrafluoroethylene (PTFE), and forming the air electrode by coating the mixture on a current collector, and forming the lithium-air battery catalyst including a gas diffusion layer, a membrane, an electrolyte, the air electrode, and a lithium anode.

The manufacturing of the electrospinning solution may include selecting a relative weight ratio between the ruthenium precursors and the manganese precursors in a range from 50:50 to 10:90.

The manufacturing of the electrospinning solution may include using different solvents selected from a group, which includes one or more of dimethylformamide (DMF), phenol, acetone, toluene, tetrahydrofuran, distilled water, ethanol, methanol, propanol, butanol, isopropanol, and alcohols, in a range from 10:90 to 90:10 as a weight ratio between a high boiling point solvent and a low boiling point solvent of the different solvents that have a boiling point difference equal to or higher than 20° C.

The low heating rate may be ranged from 0.1 to 3° C./min and the high heating rate may be ranged from 3 to 10° C./min.

The forming of the lithium-air battery catalyst may include forming the lithium-air battery catalyst in a weight ranged from 1 to 50%, the conductive material in a weight ranged from 50 to 90%, and the adhesive material in a weight ranged from 1 to 10%.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Unless defined otherwise, all technical and scientific terms used herein may have the same meanings as being understood by those skilled artisans in the art of the inventive concept. Generally, the terminology used herein will be used in the boundary of usual understandings or may be in common use in the art.

In embodiments of the inventive concept, methods of manufacturing a lithium-air battery catalyst including a ruthenium oxide-manganese oxide complex tubes structure having a core fiber-shell patterned nanotubes structure or a double walls patterned composite double tubes structure, and manufacturing a lithium-air battery air electrode including a catalyst will be described by Embodiment 1 and Embodiment 2. Additionally, a lithium-air battery air electrode excluding a catalyst will be described by Comparison 1. Finally, it will be seen from Embodiment 3, through electrochemical characteristics evaluation for the lithium-air battery, that an air electrode including a catalyst has remarkably enhanced activities of OER and ORR and prominent lifetime characteristics.

Figure 1:
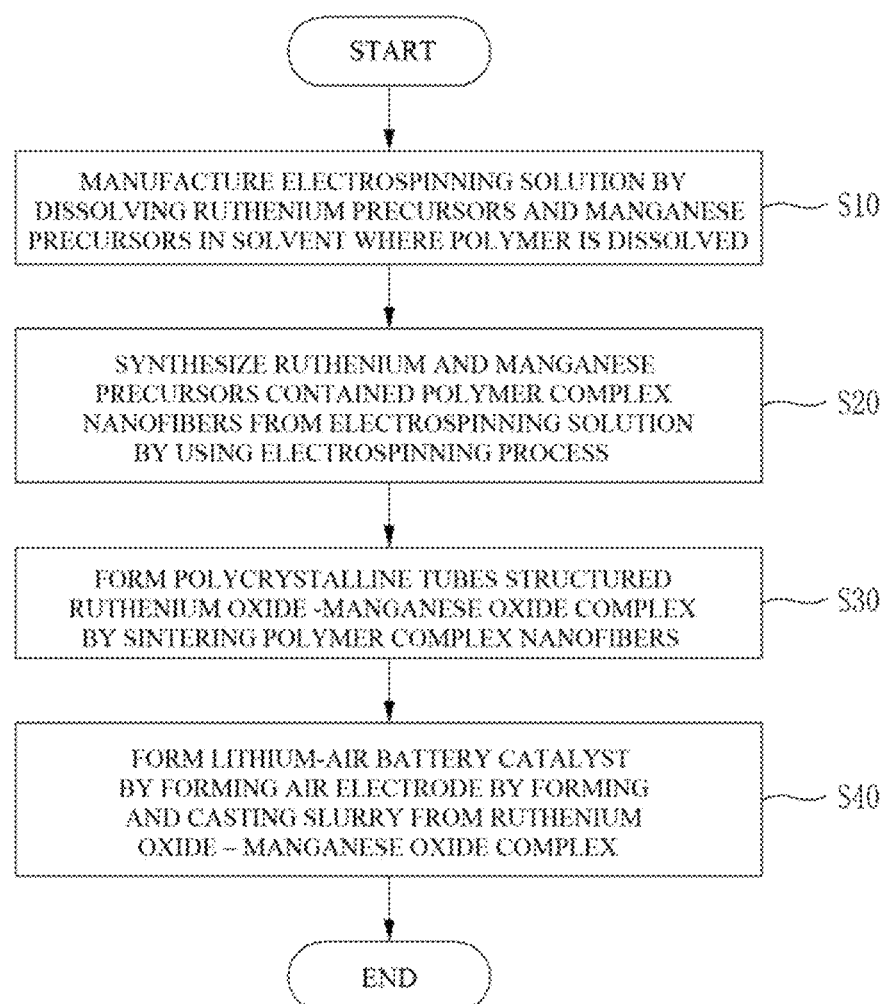
FIG. 1 is a flow chart showing a manufacturing method of a lithium-air battery catalyst having a 1D polycrystalline tubes structure formed of a ruthenium oxide-manganese oxide complex according to an embodiment of the inventive concept.

FIG. 1 is a flow chart showing a manufacturing method of a lithium-air battery catalyst having a 1D polycrystalline tubes structure formed of a ruthenium oxide-manganese oxide complex according to an embodiment of the inventive concept.

Referring to FIG. 1, a manufacturing method of a lithium-air battery catalyst including a ruthenium oxide-manganese oxide complex tubes structure having a core fiber-shell patterned nanotubes structure or double walls patterned composite double tubes structure will be described in detail.

In operation S10, an electrospinning solution may be manufactured by dissolving ruthenium precursors and manganese precursors in a solvent where a polymer is dissolved.

The electrospinning solution may be selected in a relative weight between the ruthenium precursors and the manganese precursors from 1:99 to 99:1. As an example, the weight ratio between the ruthenium precursors and the manganese precursors may be selected in a range from 50:50 to 10:90.

Additionally, the electrospinning solution may use different solvents selected from a group, which includes one or more of dimethylformamide (DMF), phenol, acetone, toluene, tetrahydrofuran, distilled water, ethanol, methanol, propanol, butanol, isopropanol, and alcohols, in a range from 10:90 to 90:10 as a weight ratio between a high boiling point solvent and a low boiling point solvent of the different solvents that have a boiling point difference equal to or higher than 20° C.

Metallic precursors used herein may be salts including the aforementioned metals, for example, one, or a mixture of two or more, selected from metallic salts which are patterned of acetate, chloride, acetylacetonate, nitrate, methoxide, ethoxide, butoxide, isopropoxide, sulfide, oxytriisopropoxide, (ethyl or cethylethyl) hexanoate, butanoate, ethylamide, or amide.

The electrospinning solution must include a polymer for electrospinning. The polymer may form a fibrous pattern by allowing viscosity to the electrospinning solution and may control a structure of spun fibers by compatibility with precursors for metal or metallic oxide. For example, the aforementioned core-shell nanotubes and complex double tubes structure may be even implemented by using only a monotype of polyvinylpyrrolidone (PVP).

The polymer may have an average molecular weight (Mw) from 100,000 to 1,500,000 g/mol. As an example, an average molecular weight of the polymer may be ranged from 500,000 to 1,300,000 g/mol to successfully maintain a metallic oxide nanofibrous pattern resulting from an electrospinning and high temperature thermal treatment.

The polymer may not be restrictive if it satisfies the aforementioned average molecular weight. For example, the polymer may be polyvinylacetate (PVAc), polyvinylpyrrolidone (PVP), polyvinylalcohol (PVA), polyethylene oxide (PEO), polyaniline (PANi), polyacrylonitrile (PAN), polymethylmethacrylate (PMMA), polyacrylic acid (PAA), or polyvinylchloride (PVC).

Additionally, a weight ratio between the metallic precursors and the polymer may be ranged from 5:1 to 1:5 to maintain a nanofibrous pattern. As an example, it may be permissible for a weight ratio between the metallic precursors and the polymer to be ranged from 3:1 to 1:2 to form core fiber-shell nanotubes or complex double tubes.

A phase separation effect between the polymer and the metallic precursors may be accelerated during the electrospinning by adopting different solvents, which are different in boiling points, as a solvent dissolving the metallic precursors. For example, the metallic precursors are more easily dissolved in a first solvent, which is different from a solvent (i.e., a second solvent) where the polymer is dissolved, than in the second solvent. Such differences of solubility and boiling points may accelerate a synthesis of core fiber-shell structured nanofibers of phase separated polymer-metallic precursors.

In more detail, in the case of using a solvent, as the first solvent, which is included in the electrospinning solution and has a lower boiling point by about 20° C. or more than that of the second solvent, the first solvent abruptly evaporates during the electrospinning process and thus the metallic precursors dissolved in the first solvent migrate toward the surface of nanofibers. Then, the polymer naturally congregates toward the center of the nanofibers and thereby the nanofibers turn to form the core fiber-shell structured nanofibers of the polymer-metallic precursors.

For the first or second solvent, it may be available to adopt a kind of solvent sufficient in dissolving metallic precursors and a polymer, to use an alcoholic solvent such as dimethylformamide (DMF), phenol, acetone, toluene, tetrahydrofuran, distilled water or ethanol, methanol, propanol, butanol, or isopropanol, or to select one in which solvents different by 20° C. or more in boiling points are formed of a higher boiling-point solvent and a lower boiling-point solvent which are in a weight ratio ranged from 10:90 to 90:10. As an example, the aforementioned core-shell nanotubes and complex composite tubes may be implemented by using distilled water for the first solvent and dimethylformamide (DMF) for the second solvent.

In operation S20, the electrospinning solution may be used for synthesizing polymer complex nanofibers, which include ruthenium precursors and manganese precursors, through an electrospinning process.

The manufacturing method may include an electrospinning process of electrospinning an electrospinning solution by using an electrospinning device formed of a single nozzle to which a high voltage is applied. The electrospinning process may be performed by maintaining peripheral humidity lower than 50%, supplying the solution in an injection rate from 0.001 to 1 ml/min, and applying a voltage from 10 to 24 kV.

Especially, nanofibers may be even obtained by using a drum-type collector which is distant in a range of 10 to 30 cm from a tip of the single nozzle.

In operation S30, a ruthenium oxide-manganese oxide complex having a polycrystalline tubes structure may be formed by treating the polymer complex nanofibers at high temperature.

The ruthenium oxide may have a phase of $RuO_2$ and further include iridium oxide ($IrO_2$) or cobalt oxide ($Co_3O_4$), which is highly active OER catalyst, in addition to $RuO_2$, but may not be restrictive hereto.

The manganese oxide may have a phase of $Mn_2O_3$ and further include a phase of $\alpha$-$MnO_2$, $\delta$-$MnO_2$, $\gamma$-$MnO_2$, or $\beta$-$MnO_2$, or another oxide catalyst which is highly active ORR catalyst, without limitation in addition to $Mn_2O_3$.

A ruthenium oxide and a manganese oxide may be synthesized in a core fiber-shell patterned nanotubes structure or double walls patterned complex double tubes structure by processing polymer-metallic precursors included nanofibers in a thermal treatment with different heating rates.

In more detail, during the thermal treatment under high temperature, a ruthenium oxide-manganese oxide complex may be formed in a polycrystalline tubes structure by at least one of a core fiber-shell patterned nanotubes structure, which is thermally processed with a low heating rate, and a double walls patterned composite double tubes structure thermally processed with a high heating rate.

For crystallizing the ruthenium oxide and the manganese oxide and burning the polymer, a processing condition may be maintained under high temperature from 400 to 1000° C. for 5 minutes to 12 hours. As an example, a core fiber-shell patterned nanotubes structured or double walls patterned composite double tubes structured ruthenium oxide-manganese oxide complex may be implemented by maintaining a processing condition under temperature from 500 to 700 for 1 to 3 hours.

A core fiber-shell patterned nanotubes structured or double walls patterned composite double tubes structured ruthenium oxide-manganese oxide complex may be synthesized by differentiating heating rates during thermal treatment. For example, the ruthenium oxide having a lower crystallization temperature may be first crystallized and then subsequently the manganese oxide may be crystallized.

In more detail, under a low heating rate, the first formed ruthenium oxide may meet an Ostwald ripening effect in a polymer matrix and a sufficient time may be permissible for the ruthenium oxide to be concentrated on the middle. Afterward, along elevation of temperature, the manganese oxide naturally remaining outside may begin to be crystallized to form a core fiber-shell patterned nanotubes structure with full phase separation between the ruthenium oxide and the manganese oxide.

Otherwise, under a high heating rate, as there is not provided a sufficient time for the concentration to the middle in the polymer matrix even though the ruthenium oxide is also first crystallized, it may be permissible to form a double walls composite double tubes structure simultaneously appearing at the inside and outside of the tubes together with the manganese oxide which is formed later.

The lower heating rate may be ranged from 0.1 to 3° C./min and the higher heating rate may be ranged from 3 to 10° C./min, but embodiments of the inventive concept may not be restrictive hereto. The heating rates may be variable dependent on kinds of metallic precursors, crystallization temperature of metallic oxides, glass transition temperature by kinds of polymers, and ratios of metallic oxides and polymers.

For example, a core fiber-shell patterned ruthenium oxide-manganese oxide complex may be formed in a heating rate of 1° C./min and a double walls patterned composite double tubes structured ruthenium oxide-manganese oxide complex may be formed in a heating rate of 5° C./min.

In operation S40, the ruthenium oxide-manganese oxide complex may be used to form slurry. The slurry may be formed into an air electrode and then a lithium-air battery catalyst may be formed thereby.

This process of forming the lithium-air battery catalyst may form the air electrode by selecting at least one or more of a core fiber-shell patterned nanotubes structure or a double walls patterned composite double tubes structure, mixing a ruthenium oxide-manganese oxide complex with a conductive material, which includes at least one or more of Ketjen black, graphene, and carbon nanotubes, and an adhesive material including at least one or more of polyvinylidene fluoride (PVdF), styrene-butadiene rubber (SBR)/ carboxymethyl cellulose (CMC), and polytetrafluoroethylene (PTFE), and coating the mixture on a current collector. Afterward, it may be processed to form the lithium-air battery catalyst including a gas diffusion layer, a membrane, an electrolyte, the air electrode, and a lithium anode.

The lithium-air battery air electrode may be formed through a slurry casting on a nickel-mesh typed current collector, which is well ventilated, with slurry including a lithium-air battery catalyst, conductive material, and an adhesive material.

Additionally, the lithium-air battery air electrode may include a lithium-air battery catalyst having a weight from 0 to 99%, a conductive material having a weight from 1 to 99%, and an adhesive material having a weight from 1 to 99%. As an example, the lithium-air battery air electrode may include a lithium-air battery catalyst having a weight from 1 to 50%, a conductive material having a weight from 50 to 90%, and an adhesive material having a weight from 1 to 10%.

For the purpose of confirming activity of catalysts in Embodiment 1 and Embodiment 2 described below, an air electrode was used including 30% weight of a ruthenium oxide-manganese oxide catalyst having a core fiber-shell patterned nanotubes structure or a double walls patterned composite double tubes structure, 60% weight of Ketjen black as a conductive material, and 10% weight of PVdF as an adhesive material. For a comparison example, an air electrode was used including 90% weight of Ketjen black as a conductive material and 10% weight of PVdF as an adhesive material.

Hereafter, a lithium-air battery catalyst having a 1D polycrystalline tubes structure formed of a ruthenium oxide-manganese oxide complex made by a manufacturing method of the lithium-air battery catalyst having the 1D polycrystalline tubes structure formed of the ruthenium oxide-manganese oxide complex will be described in detail through an embodiment of the inventive concept.

A lithium-air battery catalyst having a 1D polycrystalline tubes structure formed of a ruthenium oxide-manganese oxide complex according to an embodiment may include the ruthenium oxide-manganese oxide complex having at least one polycrystalline tubes structure of a core fiber-shell patterned nanotubes structure and a double walls patterned composite double tubes structure, and the ruthenium oxide-manganese oxide complex may be used as a catalyst for an air electrode.

In the ruthenium oxide-manganese oxide complex, the ruthenium oxide may be $RuO_2$ and the manganese oxide may be at least one or more of $Mn_2O_3$ and $MnO_2$.

In the core fiber-shell patterned nanotubes structure, core fibers in which ruthenium oxides are placed may be structured in nanofibers and shells in which manganese oxides are placed may be structured in a shape of tubes. Air gaps may be present between the core fibers and the shells, thereby forming a nanotubes structure where the core fibers and the shells are separated each other.

Additionally, such air gaps may be ununiformly distributed between the core fibers and the shells, and the core fibers and the shells may be locally mixed in the structure. The core nanofibers may have diameters ranged from 10 to 500 nm and nanotubes forming the shells may have diameters ranged from 15 to 1,000 nm.

In the double walls patterned composite double tubes structure, core fibers and shells may not be divided because phase separation does not occur. The double walls patterned composite double tubes structure may be shaped in double walls formed of inner and outer tubes. The inner and outer tubes may be uniformly composited in a mixture of ruthenium oxide and manganese oxide.

In the double walls patterned composite double tubes structure, air gaps may be present between inner and outer walls, and the tubes may be respectively divided by the air gaps in intervals from 5 to 500 nm. The double walls patterned composite double tubes structure may be even structured without local divisions between the inner and outer walls.

The double walls patterned composite double tubes structure may have a double walls pattern formed of inner and outer tubes. The inner tubes may have diameters ranged from 10 to 500 nm and the outer tubes may have diameters ranged from 15 to 1,000 nm.

Additionally, thicknesses of the outer walls of the shells of the core fiber-shell patterned nanotubes structure and thicknesses of the inner and outer walls of the double walls patterned composite double tubes structure may be ranged from 1 to 100 nm.

Accordingly, a high efficient lithium-air battery air electrode catalyst may be provided in remarkable improvement for the OER and ORR characteristics altogether.

Hereafter, the inventive concept will be more detailed through embodiments. These embodiments are merely introduced for practically exemplifying the feature of the inventive concept and it may be apparently understood by those ordinary artisans in the art that the scope of the inventive concept could not be construed as being restrictive thereto. Accordingly, the practical boundary of the inventive concept should be defined by the attached claims herein and the equivalents thereof.

(Embodiment 1)

According to an embodiment, it may be allowable to manufacture a core fiber-shell patterned nanotubes structured ruthenium oxide-manganese oxide based catalyst and a lithium-air battery air electrode including the catalyst.

1-1. An Electrospinning Solution Including Ruthenium and Manganese Precursors May be Manufactured.

After dissolving ruthenium chloride ($RuCl_3$) of 0.5 g and manganese acetate ($Mn(CH_3COO)_2.4H_2O$) of 1.0 g in a mixed solution of dimethylformamide (DMF) of 4 g and DI-water of 1 g, together with polyvinylpyrrolidone (PVP; Mw≈1,300,000) of 0.5 g, the solution may be agitated for 3 hours at 50° C.

1-2. Polymer Complex Nanofibers Including Ruthenium and Manganese Precursors Through Electrospinning May be Synthesized.

The manufactured electrospun solution may be injected through an electrospinning process in a rate of 10 μl/min. In this process, a voltage applied thereto may be maintained at 17.5 kV and an interval between a single nozzle tip and a collector (current collector) may be maintained on 15 cm.

Figure 2:
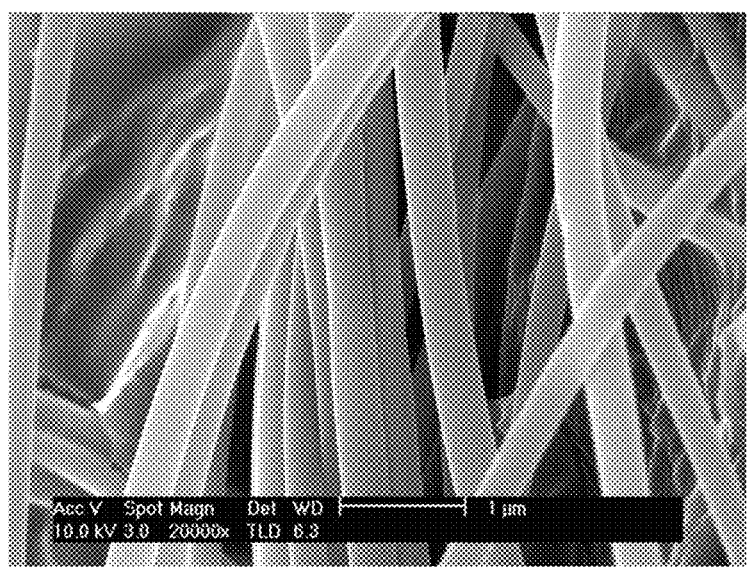
FIG. 2 shows polymer complex nanofibers including ruthenium precursors and manganese precursors according to an embodiment of the inventive concept.

FIG. 2 shows polymer complex nanofibers including ruthenium precursors and manganese precursors according to an embodiment of the inventive concept.

Referring to FIG. 2, there is shown an image of polymer complex nanofibers including ruthenium precursors and manganese precursors, the image of which is the same with complex fibers obtained after an electrospinning before forming core-shell nanotubes or complex double tubes. It can be seen through a Scanning Electron Microscope (SEM) that the nanofibers including the formed ruthenium and manganese precursors has a smooth surface and randomly distributed with diameters of about 300 nm.

1-3. A Core Fiber-Shell Patterned Nanotubes Structured Ruthenium Oxide-Manganese Oxide Complex May be Synthesized.

The nanofibers are processed under high temperature thermal treatment for one hour at 600° C. in the air condition. The core fiber-shell patterned nanotubes structured ruthenium oxide-manganese oxide complex may be manufactured by maintaining a heating rate on 1° C./min.

Figure 3:
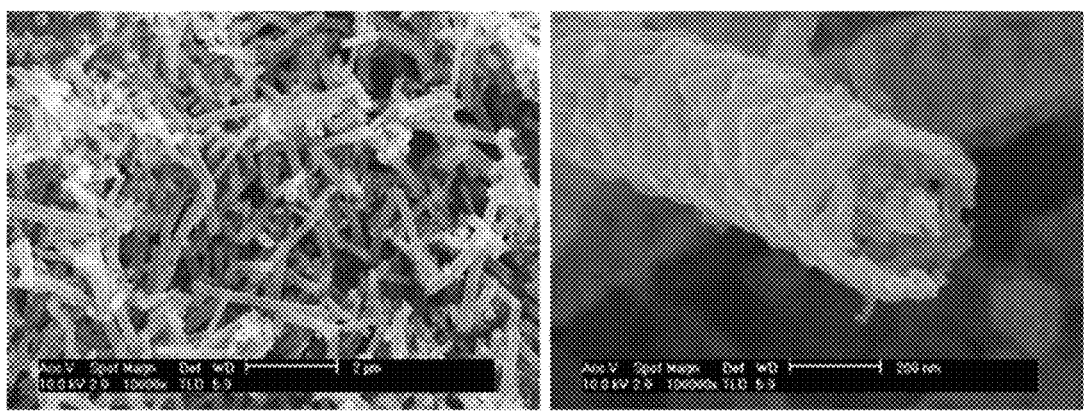
FIG. 3 shows a ruthenium oxide-manganese oxide complex having a core fiber-shell patterned nanotubes structure according to an embodiment of the inventive concept.

FIG. 3 shows a ruthenium oxide-manganese oxide complex having a core fiber-shell patterned nanotubes structure according to an embodiment of the inventive concept. Referring to FIG. 3, it can be seen from a photograph of SEM that the ruthenium oxide-manganese oxide complex having a core fiber-shell patterned nanotubes structure is formed having additional nanofibers, which are divisionally formed in tubes whose diameters are about 250 nm, through the synthesizing process.

The core fiber-shell patterned nanotubes may be first formed through crystallization of a ruthenium oxide at core positions and shells may be next formed through crystallization of a manganese oxide. During this, the ruthenium oxide and the manganese oxide may be used without limitation if they have different crystallization temperature each other, and even two or more kinds of metals made through reduction heat treatment after oxidation heat treatment may be also used without limitation.

The core fiber-shell patterned nanotubes may be clearly distinguishable by the presence of air gaps between ruthenium oxide cores and manganese oxide shells. The air gaps may be variable in correspondence with diameters of the core fibers and the outer walls.

The core nanofibers of the core fiber-shell nanotubes may have diameters ranged from 10 to 500 nm and the nanotubes forming the shells may have diameters ranged from 15 to 1,000 nm. Additionally, a thickness of the shell outer walls of the core fiber-shell patterned nanotubes structure may be ranged from 1 to 100 nm. The diameters of the core nanofibers or the nanotubes forming the shells, and a thickness of the outer walls of the shell nanotubes, in the core fiber-shell patterned nanotubes structure, may be easily controllable by amounts of precursors included therein, a ratio to a polymer, a injecting rate of the electrospinning solution, intensity of an applied voltage, an interval between the single nozzle tip and the collector, temperature of the high temperature thermal treatment, and a heating rate.

FIGS. 4A to 4F show a ruthenium oxide-cobalt oxide complex having a core fiber-shell patterned nanotubes structure according to an embodiment of the inventive concept.

Figure 4:
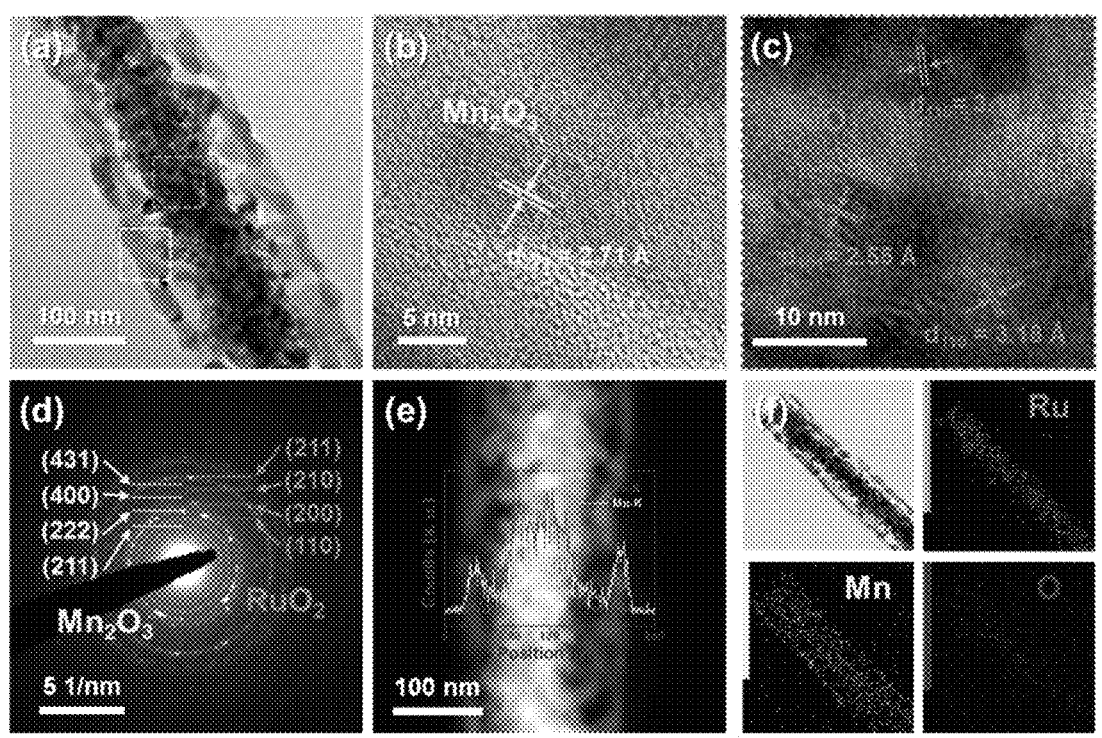
FIGS. 4A to 4F show a ruthenium oxide-cobalt oxide complex having a core fiber-shell patterned nanotubes structure according to an embodiment of the inventive concept.

As photographs of Transmission Electron Microscope (TEM) taken from the ruthenium oxide-cobalt oxide complex having the core fiber-shell patterned nanotubes structure, FIG. 4A shows a low magnifying power image, FIGS. 4B and 4C show high magnifying power image, FIG. 4D shows an image of an SAED pattern analysis, FIG. 4E shows an image of a linear elementary analysis, and FIG. 4F shows an image of a mapping elementary analysis.

From a result of confirming interplanar distances in the parts of shells and cores of FIG. 4A, it can be seen, as shown in FIG. 4B, that the shell part is identical to the (222) face of the manganese oxide $Mn_2O_3$. Additionally, as shown in FIG. 4C, it can be seen that the core part is identical to the (101) and (110) faces of the ruthenium oxide.

As shown in FIG. 4D, it can be seen from a result of the SAED pattern analysis that the nanofibers are formed with a ruthenium oxide and a manganese oxide which maintain their respective phases. As shown in FIGS. 4E and 4F, it can be seen from results of the linear elementary analysis and mapping elementary analysis that cores and shells are formed in the pattern that the cores and shells are each fully divided into a ruthenium oxide and a manganese oxide.

1-4. An Air Electrode Including a Catalyst May be Manufactured.

An N-methyl-2-pyrrolidone (NMP) solution, including 90 mg of a core fiber-shell patterned nanotubes structured ruthenium oxide-cobalt oxide catalyst, 180 mg of Ketjen black as a conductive material, and 30 mg of PVdF as an adhesive material, may be manufactured into slurry through a sufficient agitating process.

Then, an air electrode (cathode) may be manufactured by casting the manufactured slurry by a brush on a nickel mesh which is cut out in a diameter of 11.8 cm. The manufactured air electrode may be assembled in a Swagelok cell, which is used for evaluating the characteristics of lithium-air battery, in a glove box which is maintained in an Ar atmosphere.

Two lithium sheets in a diameter of 12 cm may be used as a anode, one glass filter sheet in a diameter of 12.8 cm made by Whatman Co. may be used as a membrane, and one carbon paper sheet in a diameter of 12 cm may be used as an air diffusion layer. A lithium-air battery manufactured in this course may be connected to a frame, which is prepared to allow oxygen diffusion through an upper opening, for evaluating the electrochemical characteristics.

(Embodiment 2)

It may be allowable to manufacture a double walls patterned composite double tubes structured ruthenium oxide-manganese oxide based catalyst and a lithium-air battery air electrode including the catalyst.

2-1. An Electrospinning Solution Including Ruthenium and Manganese Precursors May be Manufactured.

In the same manner with Embodiment 1-1, after dissolving ruthenium chloride ($RuCl_3$) of 0.5 g and manganese acetate ($Mn(CH_3COO)_2 \cdot 4H_2O$) of 1.0 g in a mixed solution of dimethylformamide (DMF) of 4 g and DI-water of 1 g, together with polyvinylpyrrolidone (PVP; Mw≈1,300,000) of 0.5 g, the solution may be agitated for 3 hours at 50° C.

2-2. Polymer Complex Nanofibers Including Ruthenium and Manganese Precursors Through Electrospinning May be Synthesized.

In the same manner with Embodiment 1-2, the manufactured electrospun solution may be injected through an electrospinning process in a rate of 10 µl/min. In this process, a voltage applied thereto may be maintained at 17.5 kV and an interval between a single nozzle tip and a collector may be maintained on 15 cm. As Embodiment 1 and Embodiment 2 are commonly figured such that the nanofibers including the same ruthenium and manganese precursors deform after thermal treatment, FIG. 2 may be referred the same. Referring to FIG. 2, it can be seen through a SEM that the nanofibers including the formed ruthenium and manganese precursors has a smooth surface and randomly distributed with diameters of about 300 nm.

2-3. A double walls patterned composite double tubes structured ruthenium oxide-manganese oxide complex may be synthesized. The nanofibers are processed under high temperature thermal treatment for one hour at 600° C. in the air condition. The double walls patterned composite double tubes structured ruthenium oxide-manganese oxide complex may be manufactured by maintaining a heating rate on 5° C./min.

Figure 5:
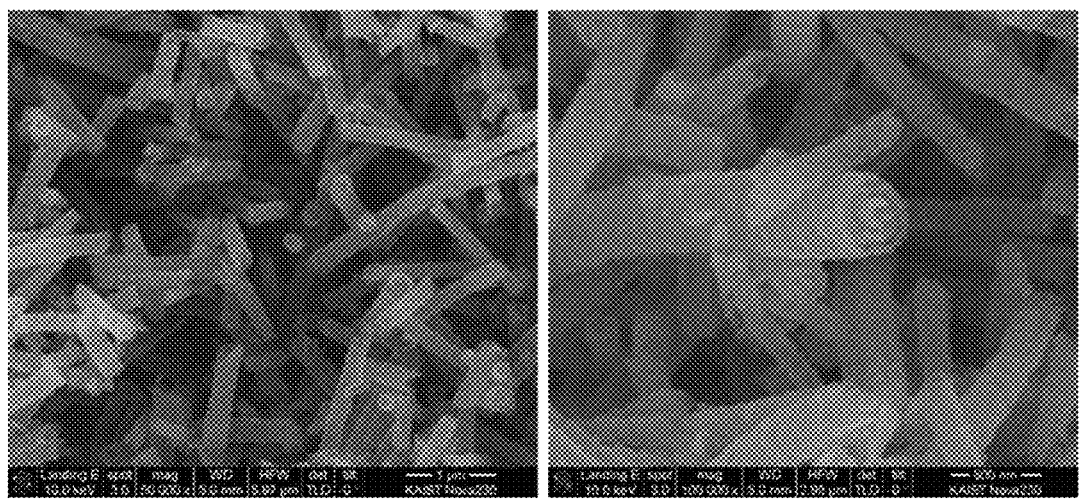
FIG. 5 shows a ruthenium oxide-manganese oxide complex having a double walls patterned composite double tubes structure according to an embodiment of the inventive concept.

FIG. 5 shows a ruthenium oxide-manganese oxide complex having a double walls patterned composite double tubes structure according to an embodiment of the inventive concept.

Referring to FIG. 5, it can be seen from a photograph of SEM that the ruthenium oxide-manganese oxide complex having a double walls patterned composite double tubes structure is formed having additional nanofibers, which are divisionally formed in tubes whose diameters are about 250 nm, through the synthesizing process.

In the double walls patterned composite double tubes structure, ruthenium oxides and manganese oxide may be randomly distributed without limitation to locations of inner and outer tubes, and may be formed coincidentally during high temperature thermal treatment.

And, as shown in FIG. 5, the double walls patterned composite double tubes may be clearly distinguishable by the presence of air gaps between the inner and outer tubes. The air gaps may be variable in correspondence with diameters and thicknesses of the inner and outer tubes. The diameters of the inner and outer tubes and a thickness of the outer walls, in the double walls patterned composite double tubes structure, may be easily controllable by amounts of precursors included therein, a ratio to a polymer, a discharging rate of the electrospinning, intensity of an applied voltage, an interval between the single nozzle tip and the collector, temperature of the high temperature thermal treatment, and a heating rate.

As shown in FIG. 5, the inner tubes of the complex double walls patterned tubes structure may have diameters ranged from 10 to 500 nm and the outer tubes may have diameters ranged from 15 to 1,000 nm. Additionally, the inner and outer walls of the double walls patterned composite double tubes structure may have thicknesses ranged from 1 to 100 nm.

Figure 6:
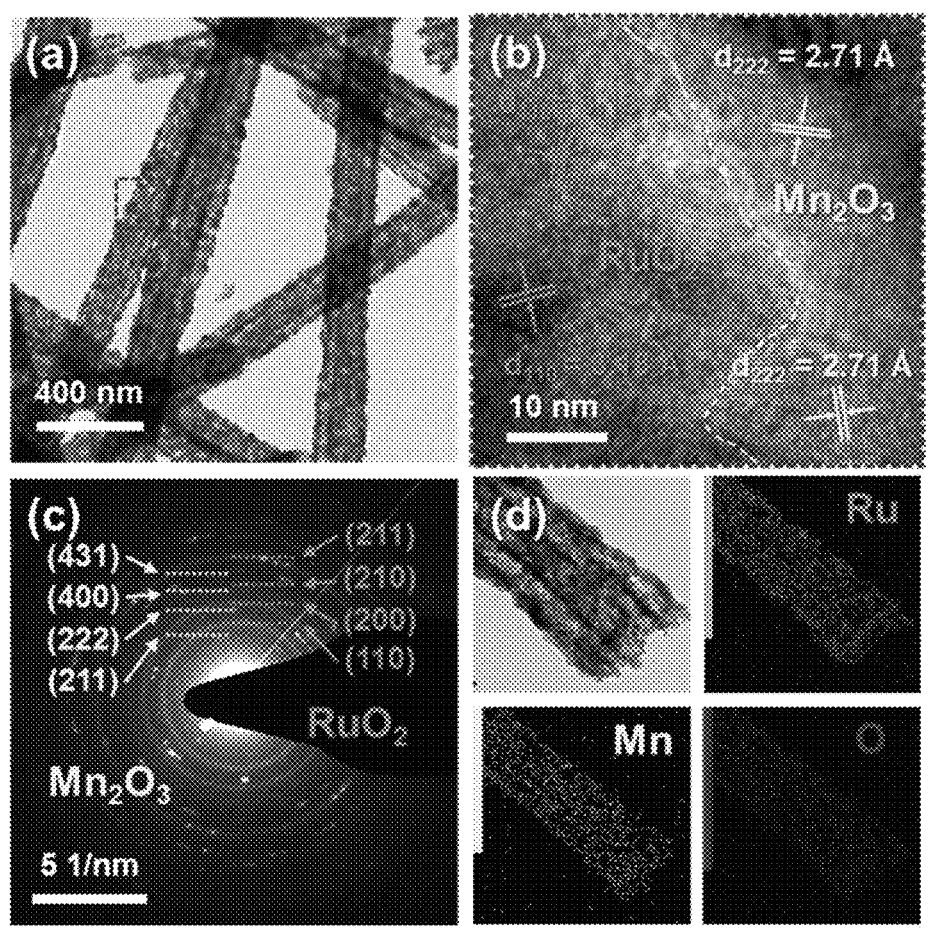
FIGS. 6A to 6D show a ruthenium oxide-manganese oxide complex having a double walls patterned composite double tubes structure according to an embodiment of the inventive concept.

FIGS. 6A to 6D show a ruthenium oxide-manganese oxide complex having a double walls patterned composite double tubes structure according to an embodiment of the inventive concept. Referring to FIGS. 6A to 6D, as photographs of Transmission Electron Microscope (TEM) taken from the ruthenium oxide-cobalt oxide complex having the double walls patterned composite double tubes structure, FIG. 6A shows a low magnifying power image, FIG. 6B shows a high magnifying power image, FIG. 6C shows an image of an SAED pattern analysis, and FIG. 6D shows an image of a mapping elementary analysis. From a result of confirming an interplanar distance at a point as shown in FIG. 6A, it can be seen that the (222) face of the manganese oxide ($Mn_2O_3$) is co-existed with the (110) face of the ruthenium oxide.

As shown FIGS. 6B and 6C, it can be seen from a result of the SAED pattern analysis that the nanofibers are formed with a ruthenium oxide and a manganese oxide which maintain their respective phases. As shown in FIG. 6D, it can be seen from results of the linear elementary analysis and mapping elementary analysis that the ruthenium oxide and the manganese oxide are homogeneously distributed the inner and outer tubes.

2-4. An Air Electrode Including a Catalyst May be Manufactured.

In the same manner with Embodiment 1-4, an N-methyl-2-pyrrolidone (NMP) solution, including 90 mg of double walls patterned composite double tubes structured ruthenium oxide-cobalt oxide catalyst, 180 mg of Ketjen black as a conductive material, and 30 mg of PVdF as an adhesive material, may be manufactured into slurry through a sufficient agitating process.

Then, an air electrode may be manufactured by casting the manufactured slurry by a brush on a nickel mesh which is cut out in a diameter of 11.8 cm. The manufactured air electrode may be assembled in a Swagelok cell, which is used for evaluating the characteristics of lithium-air battery, in a glove box which is maintained in an Ar atmosphere. Two lithium sheets in a diameter of 12 cm may be used as a anode, one glass filter sheet in a diameter of 12.8 cm made by Whatman Co. may be used as a membrane, and one carbon paper sheet of 12 cm may be used as an air diffusion layer. A lithium-air battery manufactured in this course may be connected to a frame, which is prepared to allow oxygen diffusion through an upper opening, for evaluating the electrochemical characteristics.

(Comparison 1)

A lithium-air battery air electrode without using a catalyst may be manufactured.

For comparing Embodiment 1 and Embodiment 2 in catalyst activity, Comparison 1 may be performed by using an NMP solution, which includes 270 mg of Ketjen black as a conductive material and 30 mg of PVdF as an adhesive material, except a catalyst and manufacturing slurry through a sufficient agitating process. As also, the manufactured slurry may be formed into an air electrode by casting the slurry on a nickel mesh and may be assembled through a Swagelok cell.

(Embodiment 3)

A lithium-air battery air electrode may be manufactured by using a ruthenium oxide-manganese oxide catalyst having a core fiber-shell patterned nanotubes structure or a double walls patterned composite double tubes structure, and evaluated in electrochemical characteristics.

The lithium-air batteries manufactured through Embodiment 1, Embodiment 2, and Comparison 1 were evaluated in electrochemical characteristics while being discharged and charged. During that, an injection rate was maintained on 400 mA/g.

Figure 7:
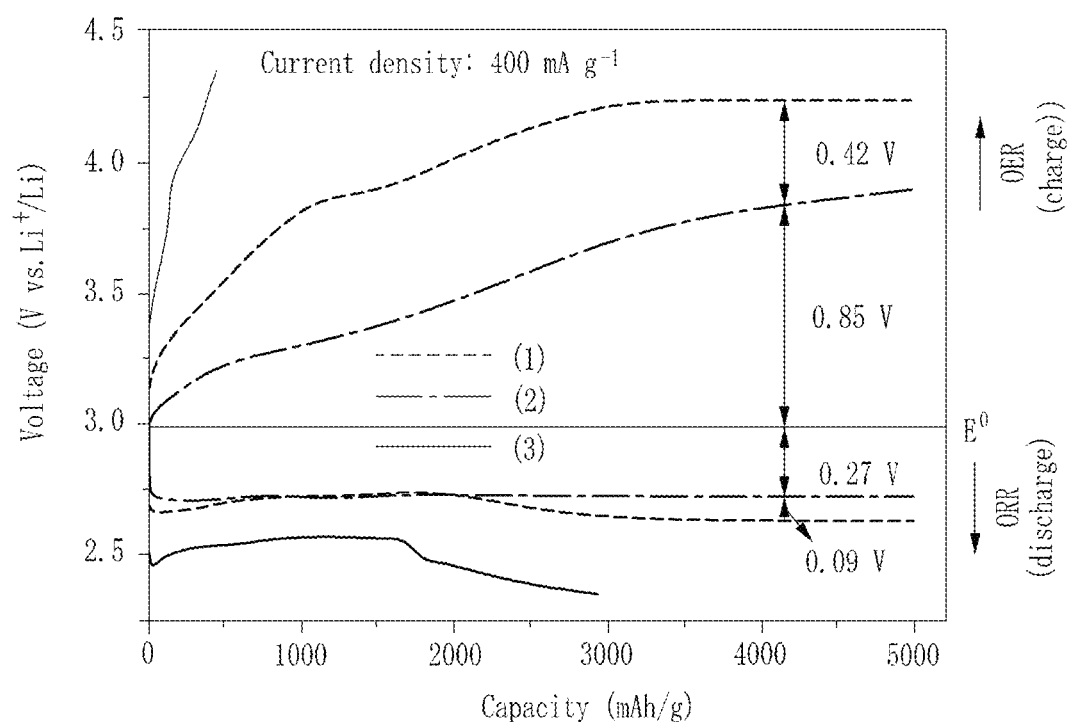
FIG. 7 is a graphic diagram showing initial charging and discharging curves according to an embodiment of the inventive concept.

FIG. 7 is a graphic diagram showing initial charging and discharging curves according to an embodiment of the inventive concept.

Referring to FIG. 7, as initial charging and discharging curves for the catalyst used lithium-air battery air electrode of Embodiment 3 and the catalyst disused lithium-air battery air electrode, the initial charging and discharging curves are restricted in a capacity of about 5,000 mAh/g for comparison. While the catalyst disused air electrode (the curve (3) of FIG. 7) showed a discharging capacity about 3,000 mAh/g and a charging capacity about 500 mAh/g and had very high overpotentials in ORR (discharging process) and OER (charging process), the core fiber-shell patterned nanotubes structure (the curve (1) of FIG. 7) and the double walls patterned nanotubes composite double tubes structure (the curve (2) of FIG. 7) had charging and discharging capacities of 5,000 mAh/g with a relatively low excessive voltage. Especially, the double walls patterned composite double tubes structure had maintained an ORR excessive voltage of 0.27 V and an OER excessive voltage of 0.85 V which are very low levels and lower by 0.09 V and 0.42 V respectively than those of the core fiber-shell patterned nanotubes structure.

Figure 8:
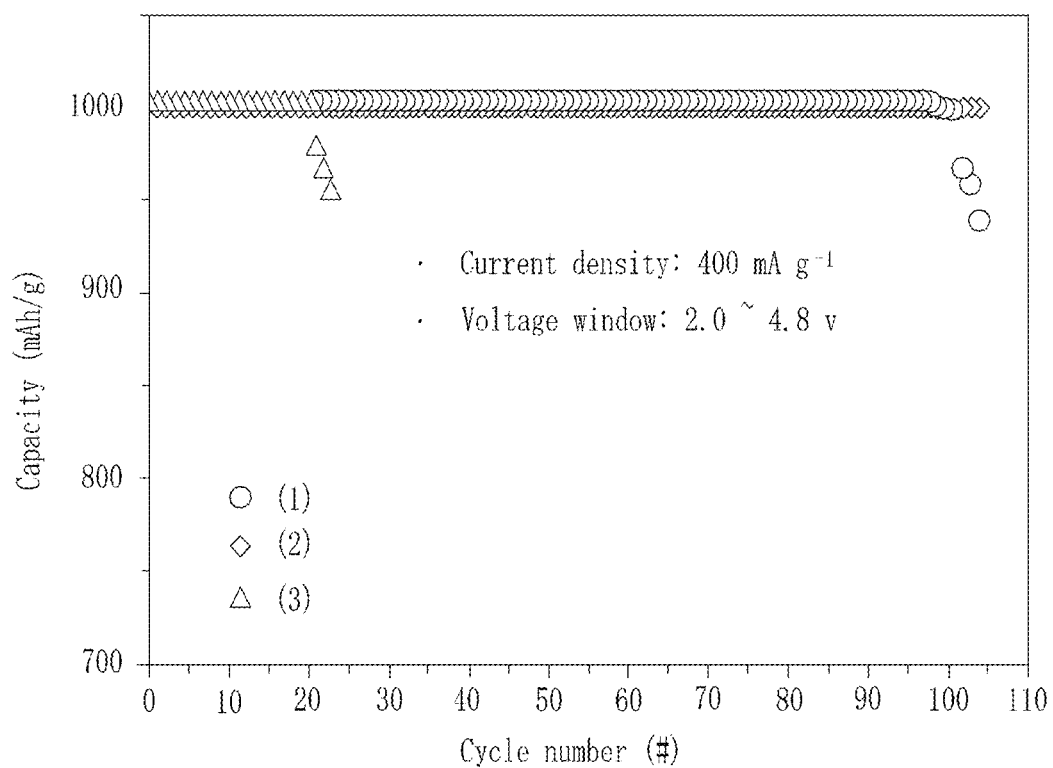
FIG. 8 is a graphic diagram showing lifetime characteristics according to an embodiment of the inventive concept.

FIG. 8 is a graphic diagram showing lifetime characteristics according to an embodiment of the inventive concept.

Referring to FIG. 8, there are shown graphs of the lifetime characteristics for the catalyst used lithium-air battery air electrode of Embodiment 3 and the catalyst disused lithium-air battery air electrode of Comparison 1.

The lifetime characteristics were evaluated by restricting the capacity on 1,000 mAh/g. While the catalyst disused air electrode (the curve (3) of FIG. 8) become rapidly lower after 20 cycles, the core fiber-shell patterned nanotubes structure (the curve (1) of FIG. 8) and the double walls patterned composite double tubes structure (the curve (2) of FIG. 8), which are manufactured through Embodiment 1 and Embodiment 2 respectively, showed remarkably improved lifetime characteristics equal to or higher than 100 cycles.

Figure 9:
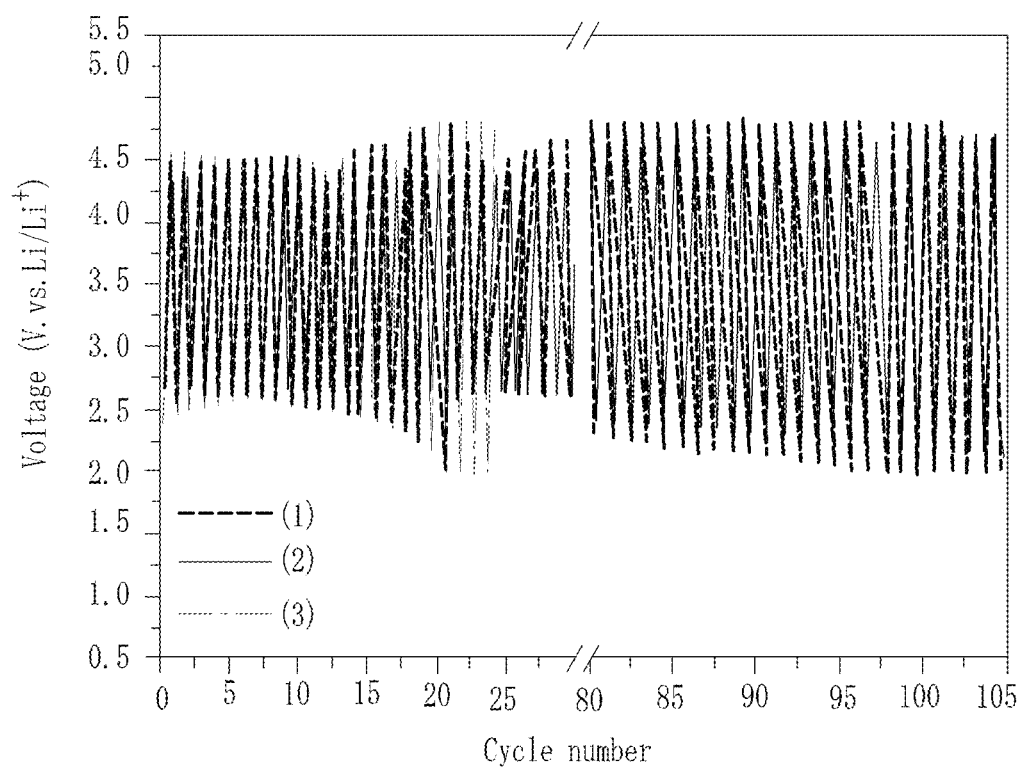
FIG. 9 is a graphic diagram showing voltage variations by time for lithium-air battery air electrodes according to an embodiment of the inventive concept.

FIG. 9 is a graphic diagram showing voltage variations by time for lithium-air battery air electrodes according to an embodiment of the inventive concept.

Referring to FIG. 9, there are shown voltage variation curves by time for the catalyst used lithium-air battery air electrode of Embodiment 3 and the catalyst disused lithium-air battery air electrode of Comparison 1.

While the catalyst disused air electrode showed rapid increases of ORR and OER overpotentials after 20 cycles (the curve (3) of FIG. 9), the core fiber-shell patterned nanotubes structure (the curve (1) of FIG. 9) and the double walls patterned composite double tubes structure (the curve (2) of FIG. 9), which are manufactured through Embodiment 1 and Embodiment 2 respectively, showed relatively stable excessive voltage characteristics. Especially, it could be seen that the double walls patterned composite double tubes structure did not have any increase of the ORR and OER overpotentials until 100 cycles. This shows that a catalyst developed by the inventive concept is helpful in remarkably improving charging-discharging efficiencies, thus providing an air electrode with highly excellent lifetime characteristics as well.

As described above, embodiments of the inventive concept relate to a lithium-air battery catalyst including a ruthenium oxide-manganese oxide composite tubes structure of a core fiber-shell patterned nanotubes structure or double walls patterned composite double tubes structure, and a manufacturing method thereof.

A manufacturing method for a ruthenium oxide-manganese oxide complex having a core fiber-shell patterned nanotubes structure or double walls patterned composite double tubes structure may be performed by dissolving ruthenium chloride and manganese acetate in a solvent, where dimethylformamide (DMF) and Di-water are mixed, together with polyvinylpyrrolidone (PVP), by obtaining nanofibers by electrospinning the solution through a single nozzle to which a high voltage is applied, and by thermally treating complex nanofibers under high temperature at different heating rates.

According to embodiments of the inventive concept, a core fiber-shell nanotubes structure, in which core fibers are made of a ruthenium oxide and shells are made of a manganese oxide, may be formed by accelerating a tubes structure from induction of phase separation between polymers and metallic precursors through different boiling points of different kinds of solvents, and by inducing a sufficient phase separation between the ruthenium oxide and the manganese oxide in correspondence with different crystallization temperature in the case of a low heating rate (1° C./min). In regard to the difficulty of permitting a sufficient time for phase separation between the ruthenium oxide and the manganese oxide in the case of a high heating rate (5° C./min), a double walls patterned composite double tubes structure may be formed with uniform distribution of the ruthenium oxide and the manganese oxide over inner and outer tubes.

Consequently, it may be allowable to accomplish an excellent functionality of a lithium-air battery by using a ruthenium oxide-manganese oxide complex, which has a core fiber-shell patterned nanotubes structure or double walls patterned composite double tubes structure formed through a manufacturing method according to the inventive concept, as an air electrode for the lithium-air battery.

According to embodiments of the inventive concept, it may be allowable to provide a highly efficient lithium-air battery air electrode catalyst with remarkably improved OER and ORR characteristics through a manufacturing method for the lithium-air battery catalyst based on a metallic oxide having a core fiber-shell nanotubes or composite double tubes structure including a ruthenium oxide and manganese oxide.

Additionally, embodiments of the inventive concept may be contributable to commercialization of lithium-air batteries and lithium-air battery based electric vehicles through electrospinning technology that permits mass production.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A lithium-air battery catalyst having a 1D polycrystalline tubes structure of a ruthenium oxide-manganese oxide complex, the lithium-air battery catalyst comprising:
the ruthenium oxide-manganese oxide complex having polycrystalline tubes structure of core fiber13 shell nanotube structures,
wherein the ruthenium oxide-manganese oxide complex forms an air electrode, and
wherein the core fiber-shell nanotube structures comprise a core comprising ruthenium oxide in a nanofiber structure, and a shell comprising manganese oxide in a tube structure, wherein the core is locally mixed with the shell due to non-uniform distribution of air gaps between the core and the shell, and
wherein the core and the shell are separated by an air gap.

2. The lithium-air battery catalyst of claim 1, wherein a ruthenium oxide of the ruthenium oxide-manganese oxide complex is $RuO_2$.

3. The lithium-air battery catalyst of claim 1, wherein a manganese oxide of the ruthenium oxide-manganese oxide complex is at least one or more of $Mn_2O_3$ or $MnO_2$.

4. The lithium-air battery catalyst of claim 1, wherein the core fiber-shell nanotube structures comprise core nanofibers having diameters from 10 to 500 nm, and the nanotubes forming shells have diameters from 15 to 1,000 nm.

5. The lithium-air battery catalyst of claim 1, wherein the polycrystalline tubes structure further comprises double wall composite double tube structures comprising:
an inner tube comprising a core fiber and a shell, which are undistinguished, without phase separation and
an outer tube,
wherein the inner tube and the outer tube each comprise a mixture of a ruthenium oxide and a manganese oxide.

6. The lithium-air battery catalyst of claim 5, wherein the inner tube and the outer tube are separated by an air gap in an interval from 5 to 500 nm or the inner tube and the outer tube have a local part that is present without separation.

7. The lithium-air battery catalyst of claim 1, wherein the polycrystalline tubes structure further comprises double wall composite double tube structures comprising an inner tube and an outer tube, the inner tube having a diameter from 10 to 500 nm, and the outer tube having a diameter from 15 to 1,000 nm.

8. The lithium-air battery catalyst of claim 1, wherein the polycrystalline tubes structure further comprises double wall composite double tube structures,
wherein a thickness of an outer wall of a shell of the core fiber-shell nanotube structures or thicknesses of inner and outer walls of the double wall composite double tube structures are from 1 to 100 nm.

9. A manufacturing method of a lithium-air battery catalyst having a 1D polycrystalline tubes structure of a ruthenium oxide-manganese oxide complex, the manufacturing method comprising:
manufacturing an electrospinning solution by dissolving ruthenium precursors and manganese precursors in a solvent where a polymer is dissolved;
synthesizing polymer complex nanofibers, which include the ruthenium precursors and the manganese precursors, from the electrospinning solution by using an electrospinning process;
forming a ruthenium oxide-manganese oxide complex having polycrystalline tubes structure comprising core fiber-shell nanotube structures by thermally treating the polymer complex nanofibers at a temperature of 400 to 1000° C. and at a heating rate from 0.1 to 3° C./min ; and
forming a slurry by using the ruthenium oxide-manganese oxide complex, and forming a lithium-air battery catalyst by forming an air electrode through a casting from the slurry.

10. The manufacturing method of claim 9, wherein the forming of the lithium-air battery catalyst comprises:
selecting at least one or more of the core fiber-shell nanotube structures,
mixing the ruthenium oxide-manganese oxide complex with a conductive material, which includes at least one or more of Ketjen black, graphene, or carbon nanotubes, and an adhesive material including at least one or more of polyvinylidene fluoride (PVdF), styrene-butadiene rubber (SBR)/carboxymethyl cellulose (CMC), or polytetrafluoroethylene (PTFE), and
forming the air electrode by coating the mixture on a current collector; and
forming the lithium-air battery catalyst including a gas diffusion layer, a membrane, an electrolyte, the air electrode, and a lithium anode.

11. The manufacturing method of claim 9, wherein the manufacturing of the electrospinning solution comprises selecting a relative weight ratio between the ruthenium precursors and the manganese precursors in a range from 50:50 to 10:90.

12. The manufacturing method of claim 9, wherein the manufacturing of the electrospinning solution comprises:
using different solvents selected from the group consisting of dimethylformamide (DMF), phenol, acetone, toluene, tetrahydrofuran, distilled water, ethanol, methanol, propanol, butanol, isopropanol, and alcohols, in a range from 10:90 to 90:10 as a weight ratio between a high boiling point first solvent and a low boiling point second solvent,
said first and second solvents having a boiling point difference equal to or higher than 20° C.

13. The manufacturing method of claim 10, wherein the forming of the lithium-air battery catalyst comprises forming the lithium-air battery catalyst in a weight ranged from 1 to 50%, the conductive material in a weight ranged from 50 to 90%, and the adhesive material in a weight ranged from 1 to 10%.

14. The manufacturing method of claim 9, wherein the polycrystalline tubes structure comprises core fiber-shell nanotube structures comprising:
a core comprising ruthenium oxide in a nanofiber structure,
a shell comprising manganese oxide in a tube, and
wherein the core and the shell are separated by an air gap.

15. The manufacturing method of claim 9, wherein the polycrystalline tubes structure comprises double wall composite double tube structures comprising:
an inner tube comprising a core fiber and a shell, which are undistinguished, without phase separation and
an outer tube,
wherein the inner tube and the outer tube each comprise a mixture of a ruthenium oxide and a manganese oxide.

* * * * *